United States Patent [19]

Claas et al.

[11] 4,202,262
[45] May 13, 1980

[54] AGRICULTURAL BALER

[75] Inventors: Helmut Claas, Harsewinkel; Gerhard Römer, Detmold; Otger Weddeling, Stadtlohn, all of Fed. Rep. of Germany

[73] Assignee: Gebr. Claas Maschinenfabrik GmbH, Harsewinkel, Fed. Rep. of Germany

[21] Appl. No.: 884,594

[22] Filed: Mar. 8, 1978

[30] Foreign Application Priority Data

Oct. 3, 1977 [DE] Fed. Rep. of Germany ....... 2710412

[51] Int. Cl.² ............................................. B30B 9/30
[52] U.S. Cl. ............................................. 100/4; 56/341; 100/45; 100/50; 100/142; 100/189
[58] Field of Search .......................... 56/341, 343, 344; 100/4, 50, 188 R, 189, 43, 45, 142

[56] References Cited

U.S. PATENT DOCUMENTS

| | | | |
|---|---|---|---|
| 2,684,802 | 7/1954 | Rothwell | 100/43 |
| 3,350,999 | 11/1967 | Morse | 100/43 |
| 3,552,109 | 1/1971 | Murray | 56/343 |
| 3,938,652 | 2/1976 | Sacht | 100/189 |
| 3,949,036 | 4/1976 | Nelson | 100/45 |
| 4,034,543 | 7/1977 | Voth | 100/50 X |

*Primary Examiner*—Billy J. Wilhite
*Attorney, Agent, or Firm*—Michael J. Striker

[57] ABSTRACT

An agricultural baler has a device for picking up stalk-type and blade-type vegetation. The picked up vegetation is inserted into a precompacting chamber wherein it is subjected to initial compacting. The degree of compaction is sensed and, when it reaches a preselected magnitude, the precompacted body of vegetation is expelled from the precompacting chamber into a main compacting chamber. The precompacted bodies are of identical or substantially identical size and density.

12 Claims, 5 Drawing Figures

AGRICULTURAL BALER

BACKGROUND OF THE INVENTION

The present invention relates to agricultural balers.

More particularly the invention relates to balers which subject blade-type vegetation (e.g. grass) or stalk-type vegetation (e.g. wheat stalks) to an initial compacting step which is followed by a final or main compacting step.

Conventional high-pressure agricultural balers compact the vegetation to form bales weighing between 10 and 30 kg and having an average density of about 150 kg/m$^3$. Handling and transporting these bales is rather labor-intensive, which presents a problem because of the steadily decreasing supply of agricultural labor. For this reason it has more recently been proposed to utilize large balers which compress the vegetation to rectangular or cylindrical bales weighing about 500 kg and having a density of between 50 and 100 kg/m$^3$. Such large bales can then be readily transported on trailers or the like, so that the use of this second type of baler constitutes a way of saving time and labor.

However, these large bales have the disadvantage that their average density of 50 to 100 kg/cm$^3$ is relatively low. This means that the capacity of trailers or similar vehicles which are used for transporting these bales is generally under-utilized, especially where transportation over long distances is required. Attempts to increase the degree of compaction and thereby the bale density, so as to be able to load more bales in the space available on the transporting vehicle, have heretofore been unsuccessful.

SUMMARY OF THE INVENTION

It is an object of the present invention to overcome these disadvantages.

More particularly, it is an object of the invention to provide an improved agricultural baler which is capable of producing large-dimensioned bales of high density, so as to be able to better utilize transporter-vehicle loading space.

Another object of the invention is to provide a baler of the kind under discussion which produces substantially rectangular bales because bales of that shape can better utilize the loading space in a transporting vehicle.

A concomitant object is to provide a baler having a precompacting chamber and a main compacting chamber, and capable of producing in the precompacting chamber compacted bodies of substantially uniform size and density which are then forwarded to the main compacting chamber.

In keeping with these objects, and with still others which will become apparent hereafter, one feature of the invention resides in an agricultural baler. Briefly stated, the baler may comprise means forming a precompressing chamber and a main compressing chamber communicating therewith, means for feeding vegetable matter into the precompressing chamber and for precompressing it therein to form a precompressed body, means for sensing when the vegetable matter in the precompressing chamber has been precompressed to a predetermined degree, and means for expelling the precompressed bodies from the precompressing chamber into the main compressing chamber when the sensing means senses that the predetermined degree of precompression is reached, so that successive precompressed bodies expelled from the precompressing chamber are of at least substantially uniform size and density.

The baler will have an expelling element that expels the precompacted bodies from the precompacting chamber. This may be in form of a slidable member of, e.g. plate- or wall-shape. The operation of this member is triggered by a sensor which senses the density of the precompressed bodies and generates a signal that causes the expelling element to operate. To keep the vegetable matter that is being fed into the precompacting chamber from interfering with the movement of the expelling member, the drive for the feeding mechanism is provided with a clutch and is disengaged during the movement of the expelling element.

The expelling element may also be constructed as a rail-guided rake which is so mounted that during its return stroke it can, on reaching a switching point on the guide rails, tilt out of the way until it has returned to its starting position. In this case the infeeding of new vegetable matter into the precompacting chamber can be continuous and without interruption or need be interrupted at most very briefly, since it will not interfere with the return stroke of the expelling element.

The expelling element is advantageously hydraulically driven. The density sensor may be connected with a pressure plate in, or a movable wall of, the precompacting chamber. The sensor can be set to sense a desired degree of compaction, e.g., by changing the prestress of a spring. Its use assures that even if the infeeding of vegetable matter per unit time fluctuates (e.g. as a result of variations in the advancing speed of the baler over a field and/or due to the differing thickness of the windraw), the precompacted bodies which are transported into the main compacting chamber are always of substantially uniform size and density. This, in turn, assures that these bodies exert a uniform pressure upon the entire surface of the compacting member (ram) of the main chamber so that unnecessary reciprocation of the compacting member (resulting from non-uniform bodies is avoided.

It is advantageous if the walls bounding the precompacting chamber diverge (e.g. conically) towards the main chamber, and if the volume of the precompacting chamber is substantially equal to the volume of that portion of the main chamber into which the contents of the precompacting chamber are being ejected. This reduces the friction of the vegetation against the walls of the precompacting chamber and permits a rapid expulsion of the contents of the precompacting chamber.

When the precompacting chamber is filled with a compacted vegetation body the sensor, upon sensing that the desired density is reached, first signals the ram in the main chamber to retract so that the opening connecting the two chambers is exposed. Thereafter the expelling member, triggered by the sensor, expels the precompacted body into the main chamber. The opening then remains closed by the expelling member until the ram in the main chamber pushes the precompacted body forwardly and moves to a position in which the ram itself closes the opening. The expelling member is then retracted to its starting position and the ram in the main chamber remains in an advanced (waiting) position until the precompacting chamber is refilled with vegetation. The ram itself may also be hydraulically operated, as is the expelling member.

The above-described hydraulic control is very advantageous for a number of reasons. This includes the fact that while the ram is in the waiting position it presses against the previously introduced precompacted body and prevents it from opening up due to the spring-back effect of the blades or stalks.

Also, if the bales are tied with a twine or wire-tying apparatus, the relatively long dwell-time of the ram in its waiting position affords sufficient time for the tying to be completed. This is important because, given the tying materials which are used in this art, the highly compacted bales must be tied at least five-fold to be securely held together. The tying apparatus—known per se in the art—is provided with a counter which counts the number of ram strokes and which operates the tying mechanism after a preselectable number of strokes. This means that each bale will be composed of a preselectable number of precompacted bodies of uniform size, so that all bales will have uniform dimension once the preselection has been made. Evidently, this is an important aspect of the invention since it assures that uniform bales will be produced which can utilize the loading space of a transporting vehicle to maximum effect.

It is desired to be able to compact the bales in the main chamber to a density as high as 200 to 250 kg/m$^3$. To achieve this a braking arrangement may be installed in the main chamber, in form of vane-type walls or starwheels, which engages in the vegetation mass and is operated hydraulically via pressure cylinders and brake elements, in such a manner that the contact pressure of the braking arrangement is adjustable to thereby vary the bale density. Due to differences in the moisture of the vegetation, and consequent changes in the coefficient of friction between the vegetation and the walls bounding the main chamber, the bale density tends to fluctuate from case to case. To compensate for this, the arrangement for selected bale density may be provided with a regulating device which is controlled by the hydraulic pressure of the fluid for the ram and which automatically adjusts the contact pressure of the braking arrangement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
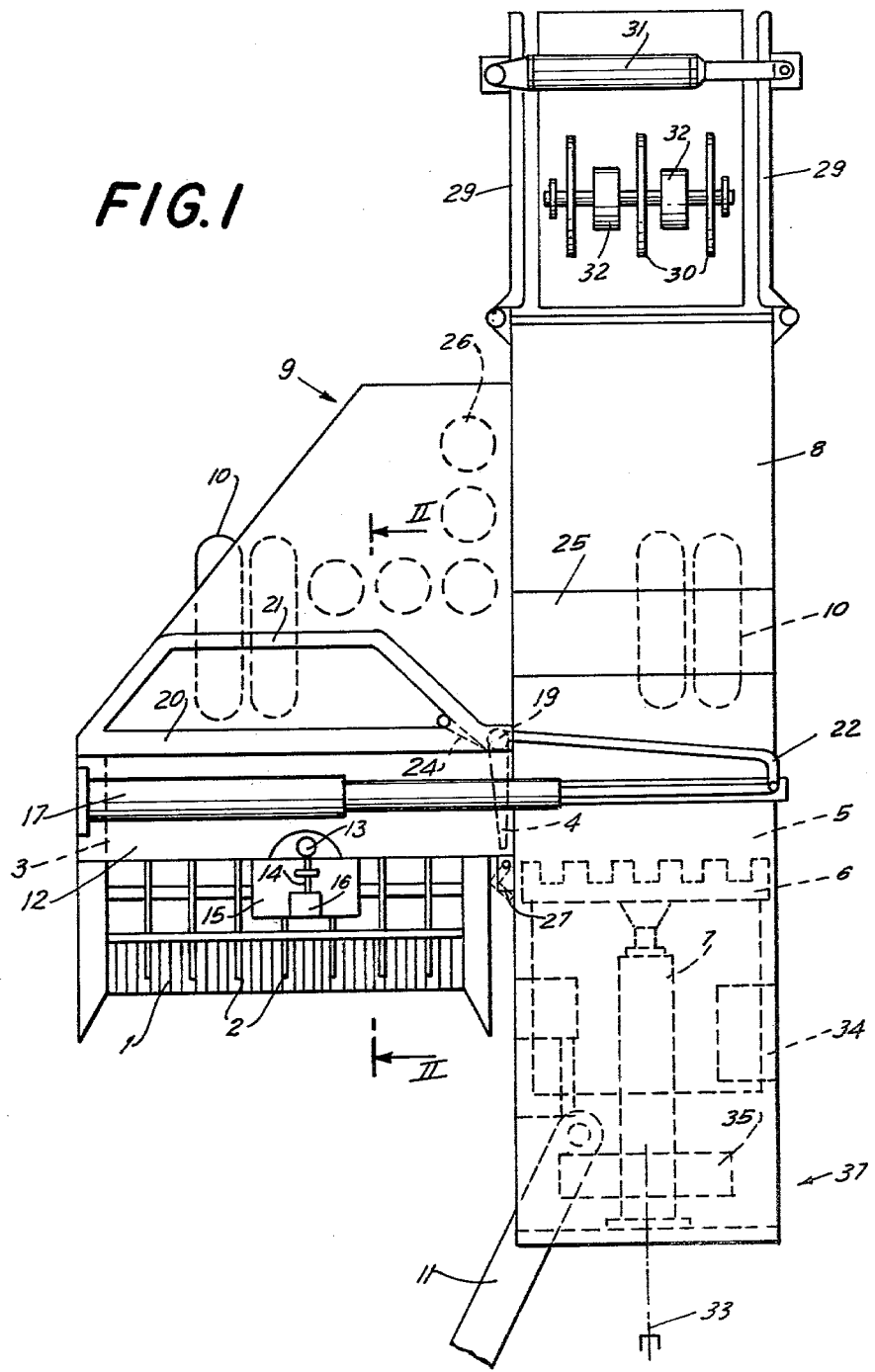
FIG. 1 is a somewhat diagrammatic top-plan view showing a baler according to the invention, with the expelling element in the expelling position.
Figure 2:
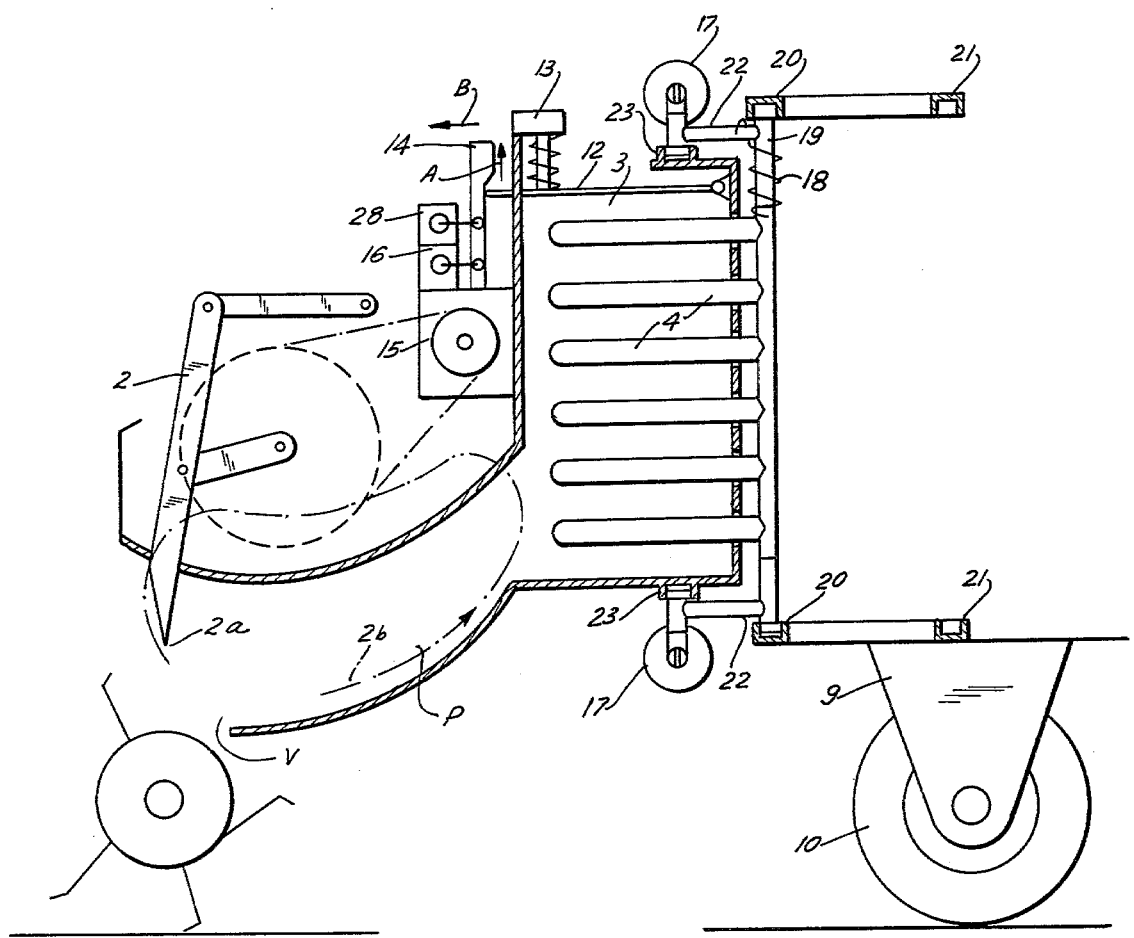
FIG. 2 is a sectional elevation taken on line II—II of FIG. 1.
Figure 3:
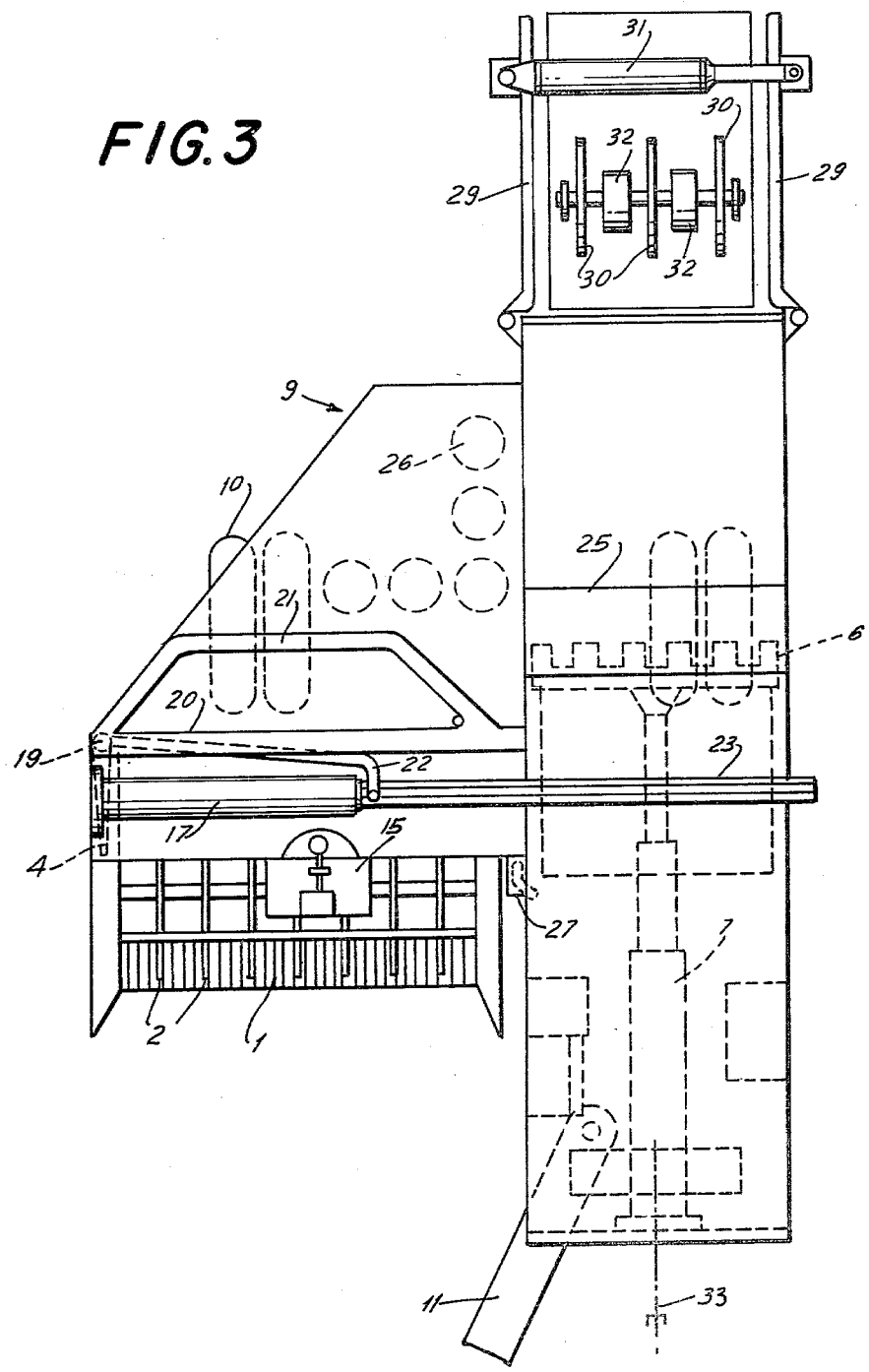
FIG. 3 is a top-plan view similar to FIG. 1 but showing the expelling element in its retracted position.
Figure 4:
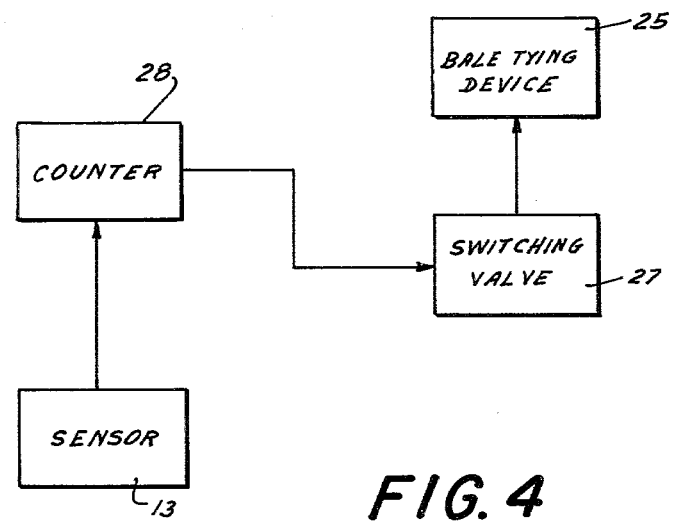
FIGS. 4 and 5 are block type views of controls used in the baler.
Figure 5:
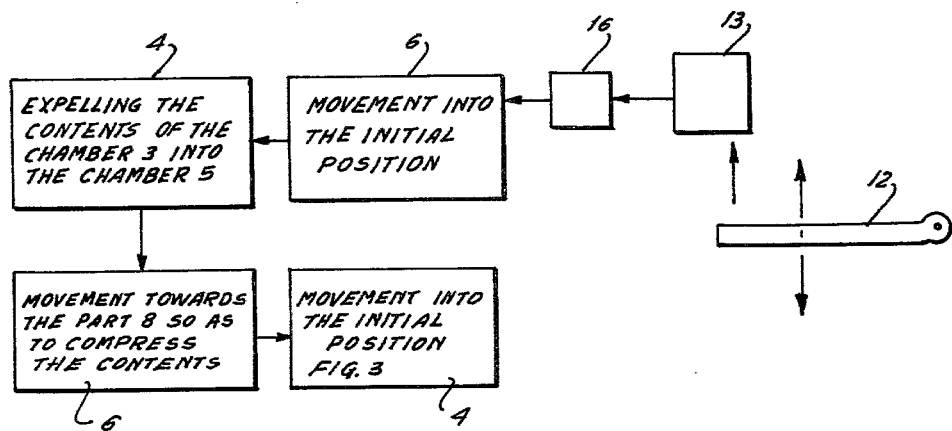

The baler illustrated in FIGS. 1–3 has a pick-up device 1 which picks up leaf-type (e.g. grass, hay) or stalk-type (e.g. wheat stalks, corn stalks) vegetation from the ground. Such devices are known per se and therefore do not require a detailed discussion or illustration.

The vegetation picked up by the device 1 is engaged by the, e.g. rake- or comb-shaped element 2 (also known per se) and pushed into the precompacting chamber 3. During this operation the tip 2a of element 2 travels in the broken-line path 2b.

In the position shown in FIG. 1 the expelling element 4 has expelled a previously precompacted body of vegetation (not shown) from the chamber 3 into the main compacting chamber 5. It is located in its end position in which it blocks the opening which connects the chambers 3 and 5 with one another. At this time the ram 6 of chamber 5 is advanced in the chamber 5 by operation of its hydraulic cylinder-and-piston unit 7, to further compress the precompacted body and to push it up against the previously admitted and compressed bodies, which are located in the rear portion 8 of chamber 5 and with which it is to form the final bale.

It will be noted that the major drive components, the articulated shaft 33, transmission 34, flywheel 35, hydraulic pumps 36 and others, are mounted in the portion 37 of chamber 5, i.e. rearwardly of the ram 6. The drive is transmitted via a mechanical connection to the devices 1 and 2.

The baler has a frame or chassis 9 which carries all the operating components and in turn is supported by the wheels 10. A pivotable attachment tongue or pole 11 is connectable to a tractor or other vehicle (not shown) which moves the baler.

As shown in FIG. 2, vegetation V picked up by the arms of the device 1 which rotates about a horizontal axis, is fed into the inlet of a passage P in which the device 2 performs the motion indicated by the broken line. Device 2 is driven for this purpose by the illustrated crank arrangement and advances the vegetation through passage P into the precompacting chamber 3. Due to the continuing infeed of further vegetation by the device 2, the contents of chamber 3 become compressed against the hinged chamber wall 12. The sensing device 13 senses the degree of such compression as a function of the pressure exerted by the contents upon the wall 12 and, when a preset level is reached, allows the wall 12 to pivot in direction outwardly of the chamber 3 (arrow A). An edge of the wall 12 is in engagement with a pivotable switching arm 14 having the illustrated inclined cam surface. Thus, when wall 12 pivots in direction of the arrow A, its edge rides up on the cam surface and thereby pivots the arm 14 in the direction of the arrow B. The arm 14 is coupled with the drive 15 for the device 2 and also with a hydraulic switching valve 16. When it pivots in the direction of arrow B the arm 14 disengages the clutch (not shown) of the drive 15 and thus temporarily stops further movement of the device 2 (and consequently the further infeed of vegetation). The same movement of arm 14 also switches the hydraulic valve to a position in which it permits the flow of hydraulic fluid to the hydraulic cylinder or cylinders 17 (two shown) which abruptly displace the expelling element 4 (shown in FIG. 2 as being of rake-shaped configuration) towards the main chamber 5, so that element 4 expels the precompacted contents of chamber 3 into the chamber 5. Since this expulsion relieves the pressure on wall 12 the same is returned to its starting position by the spring of sensing device 13 and, since in so doing the edge of door 12 moves off the inclined cam face of arm 14, the arm also returns to its starting position. This causes the clutch of drive 15 to become re-engaged so that the device 2 resumes its movement.

The expelling element 4, however, remains in its expelling position (FIG. 1) until the ram 6—which is now activated—has moved to its forward end position in which it expels the precompacted body (just received from chamber 3) from the chamber 5 (or rather the part 5 of the main chamber) into the part 8 of the main chamber, whereupon the ram 6 remains in this forward end position to maintain pressure upon the contents of the chamber part 8.

When ram 6 reaches its forward end position the expelling member 4 is retracted to its starting position (FIG. 3). However, in the meantime the chamber 3 has become partly filled with vegetation by operation of the device 2. The presence of this vegetation prevents a straight retraction of the element 4. To avoid this problem the element 4 is tiltably mounted on a carrier 19 on which it is engaged by a spring 18 that biases it to its normal operating position. Carrier 19 is guided in rails 20, 21 located above and below the chamber 3; it is moved (pulled, respectively pushed) along these rails by arms 22 which are themselves guided for to-and-fro movement in rails 23 and are moved in these by operation of the cylinder-and-piston units 17, so as to tilt the element 4 about carrier 19 against the action of spring 18.

FIG. 3 shows the element 4 in its starting position and the cylinder-and-piston units 17 in their retracted position. The chamber 3 can now be filled with vegetation by the device 2. When the vegetation in chamber 3 has been compacted to the desired degree the sensor 13 releases the wall 12 for the previously described movement which operates the clutch of drive 15 and the valve 16 as well as a counter 28. Element 4 expels the precompacted contents of chamber 3 into the part 5 of the main chamber and ram 6 advances to its forward end position, thereby expelling the precompacted contents just received from the chamber 3 into the part 8 of the main chamber. Cylinder-and-piston units 17 effect the expelling movement of element 4 by moving the carrier 19 and the element 4 via the arms 22 along the rails 20. Rails 20 have spring-biased switches 24 incorporated in them (FIGS. 1 and 3) and during the expelling movement the ends of carrier 19 which are guided in the rails 20 pass these switches 24. This has the result that during the subsequent retraction of the element 4 the carrier 19 is prevented from entering into the rails 20 and is, instead, diverted into the rails 21. Due to the different path defined by the rails 21 (see FIGS. 1 and 3) the element 4 is extracted from the chamber 3 during the return movement and re-enters the chamber 3 only at the end of the return movement, i.e. where the rails 21 merge with the rails 20. Thus, element 4 avoids the newly-introduced vegetation in chamber 3. In addition, element 4 tilts about the carrier 19 under the force of spring 18 during the retracting movement, so as to still more positively avoid any interference with its retraction by the contents of chamber 3.

As mentioned previously, the ram 6 expels the contents of chamber part 5 with the chamber part 8 before retraction of the element 4 begins. The thus expelled contents are pressed by ram 6 against the already present contents of chamber part 8. Ram 6 remains in this forward end position until chamber 3 is filled again and ready for expulsion of its precompacted contents.

Above that portion of chamber part 8 where the ram 6 stops in its forward end position, there is mounted a bale-tying apparatus 25 and its container 26 (both known) for twine or wire rolls.

The counter 28 is operated by the sensing device 13 in a conventional manner known, for example, from the agricultural baler which is available on the market under the name "Glass Magnum." It is also known, for example in the above-mentioned agricultural baler, to operate a hydraulic switching valve 27 by the counter 28. When the counter 28 actuates the switching valve 27, the latter starts the operation of the apparatus 25 which ties up the bale (formed of the preselected number of precompressed bodies of vegetation which have been expelled from chamber 3) in the main-chamber part 8.

The switch 27 is interconnected with the switch 16, to assure that the ram 6 can be retracted from its forward end position only after tying of the bale is completed.

At the far end of the main-chamber part 8 there is located a braking arrangement (FIG. 3) composed of two pivotable walls 29, star-wheels 30 (here three of them) which penetrate with their teeth into the bale in chamber part 8, and a hydraulic cylinder-and-piston unit 31. This arrangement can vary the expulsion resistance of the bales from part 8 and thus adjust the pressure exerted upon the bale in part 8 by the ram 6. The star-wheels 30 are mounted on a shaft which is engaged with brake drums 32 whose engagement force on the shaft can also be hydraulically varied. Thus the walls 29 are pivotable about an axis so as to arrange the star wheels 30 and the brake drums 30 in the chamber part 8. The star wheels 30 penetrate (i.e. engage) with their teeth into the vegetation mass (i.e. the bales) so as to vary the density of the latter.

While the invention has been illustrated and described as embodied in an agricultural baler, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural baler for baling of vegetable matter, comprising means forming a precompressing chamber and a main compressing chamber communicating therewith; means for feeding vegetable matter into said precompressing chamber and for precompressing it therein to form a precompressed body; means for sensing when the vegetable matter in said precompressing chamber has been precompressed to a predetermined degree; means for expelling the precompressed bodies from said precompressing chamber into said main compressing chamber when said sensing means senses that said predetermined degree of precompression is reached, so that successive precompressed bodies expelled from said precompressing chamber are of at least substantially uniform size and density; and means operatively connecting said expelling means with said feeding means for temporarily shutting down the latter while said expelling means expel the precompressed bodies from said precompressing chamber into said main compressing chamber.

2. An agricultural baler as defined in claim 1, said means for feeding comprising a drive; and said means for expelling comprising an expelling element movable between a starting position and an expelling position, and said shutting down means being operative for temporarily disengaging the drive during movement of said expelling element to said expelling position.

3. An agricultural baler as defined in claim 2, said expelling element being rake-shaped, and said expelling means further comprising guide rails guiding said expelling element for movement to said expelling position in a first path, and thereupon guiding the expelling element for movement to said starting position in a second path which is offset from said first path.

4. An agricultural baler as defined in claim 2; further comprising an ram movable in said main compressing chamber between a retracted rest position and an advanced operating position; and means operatively connecting said ram and said expelling means for initiating movement of said ram to said operating position in response to movement of said expelling element to said expelling position.

5. An agricultural baler as defined in claim 2; and further comprising means for typing a bale formed in said main compressing chamber from a plurality of said bodies expelled from said precompressing chamber.

6. An agricultural baler as defined in claim 5, said tying means comprising a tying apparatus, and a counter operatively connected with the same and with said expelling means for initiating operation of said tying apparatus when said expelling element has moved to said expelling position a predetermined number of times.

7. An agricultural baler as defined in claim 1; further comprising hydraulic means for operating said expelling means.

8. An agricultural baler as defined in claim 1, said precompressing chamber including a movable member against which the vegetable matter is compressed; said sensing means sensing the pressure exerted upon the movable member and permitting the latter to move when the pressure reaches a predetermined level; and further comprising means operatively connecting said movable member with said expelling means to initiate operation of the latter in response to movement of the former.

9. An agricultural baler as defined in claim 1, wherein said precompressing chamber diverges in direction towards said main compressing chamber.

10. An agricultural baler as defined in claim 1, said main compressing chamber comprising a first part into which the bodies are expelled from said precompressing chamber, and a second part; and wherein the volumetric content of said precompression chamber is equal to that of said first part.

11. An agricultural baler as defined in claim 1; further comprising a ram movable in said main compressing chamber for compressing and consolidating therein a number of said bodies to form a bale; and means for varying the pressure exerted by said ram upon said bale so as to adjust the density of the bale.

12. An agricultural baler as defined in claim 1; and further comprising means for connecting said baler to a source of motive power.

* * * * *